(12) United States Patent
Szwalbenest

(10) Patent No.: US 9,240,012 B1
(45) Date of Patent: Jan. 19, 2016

(54) SYSTEMS AND METHODS FOR MULTIFACTOR AUTHENTICATION

(71) Applicant: JPMorgan Chase Bank, N.A., New York, NY (US)

(72) Inventor: Stanley A. Szwalbenest, Newtown, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 14/313,159

(22) Filed: Jun. 24, 2014

Related U.S. Application Data

(63) Continuation of application No. 11/610,289, filed on Dec. 13, 2006, now Pat. No. 8,793,490.

(60) Provisional application No. 60/830,672, filed on Jul. 14, 2006.

(51) Int. Cl.
*H04L 29/00* (2006.01)
*G06Q 20/40* (2012.01)
(Continued)

(52) U.S. Cl.
CPC ............ *G06Q 20/4014* (2013.01); *G06F 17/60* (2013.01); *H04M 1/66* (2013.01)

(58) Field of Classification Search
CPC .................................. G06F 17/60; H04M 1/66
USPC .............................. 705/42, 67; 380/33; 726/3
See application file for complete search history.

(56) References Cited

U.S. PATENT DOCUMENTS 3,705,385 A 12/1972 Batz
3,860,870 A 1/1975 Furuya
(Continued)

FOREIGN PATENT DOCUMENTS

CA 2430549 6/2002
DE 19731293 1/1999
(Continued)

OTHER PUBLICATIONS

Kutler, A Different Drummer on the Data Highway, American Banker, Section: No. 91, vol. 160, May 12, 1995, p. 14.
(Continued)

*Primary Examiner* — Brandon Hoffman
*Assistant Examiner* — Michael D Anderson
(74) *Attorney, Agent, or Firm* — Hunton & Williams LLP

(57) ABSTRACT

The invention provides a method for performing an authentication (and a system for performing the method), in conjunction with a transaction, utilizing a primary channel and a secondary channel. The method may include an authenticating entity, such as a bank, (1) receiving from a customer primary authentication information via a primary channel; (2) the authenticating entity processing the primary authentication information, and retrieving customer information based on the primary authentication information; (3) the authenticating entity transmitting secondary authentication information to the customer via a secondary channel, the secondary channel being different than the primary channel; (4) the authenticating entity receiving from the customer at least a portion of the secondary authentication information; and (5) the authenticating entity performing authentication processing on the secondary authentication information received from the customer. Based on the successful authentication of the primary authentication information and the secondary authentication information received from the customer, the authenticating entity approves the customer for the transaction.

24 Claims, 8 Drawing Sheets

(51) Int. Cl.
*H04M 1/66* (2006.01)
*G06F 17/00* (2006.01)

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holmann |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Mashayekhi |

(56) References Cited

U.S. PATENT DOCUMENTS

| | | |
|---|---|---|
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| RE36,116 E | 2/1999 | McCarthy |
| 5,866,889 A | 2/1999 | Weiss et al. |
| 5,870,718 A | 2/1999 | Spector |
| 5,870,724 A | 2/1999 | Lawlor |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 6,000,033 A | 12/1999 | Kelley et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |

(56) References Cited

U.S. PATENT DOCUMENTS

| | | |
|---|---|---|
| 6,065,675 A | 5/2000 | Teicher |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditisky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,366,682 B1 | 4/2002 | Hoffman et al. |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,449,765 B1 | 9/2002 | Ballard |
| 6,453,353 B1 | 9/2002 | Win et al. |
| 6,460,141 B1 | 10/2002 | Olden |
| 6,487,641 B1 | 11/2002 | Cusson et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,507,912 B1 | 1/2003 | Matyas, Jr. et al. |
| 6,510,523 B1 | 1/2003 | Perlman et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,675,261 B2 | 1/2004 | Shandony |
| 6,684,384 B1 | 1/2004 | Bickerton et al. |
| 6,687,222 B1 | 2/2004 | Albert et al. |
| 6,687,245 B2 | 2/2004 | Fangman et al. |

(56) References Cited

U.S. PATENT DOCUMENTS

| | | |
|---|---|---|
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,080,036 B1 | 7/2006 | Drummond et al. |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,103,556 B2 | 9/2006 | Del Rey et al. |
| 7,117,239 B1 | 10/2006 | Hansen |
| 7,137,006 B1 | 11/2006 | Grandcolas et al. |
| 7,185,094 B2 | 2/2007 | Marquette et al. |
| 7,870,202 B2 * | 1/2011 | Madams et al. .............. 709/206 |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edward et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0177067 A1 | 9/2003 | Cowell et al. |
| 2003/0191549 A1 | 10/2003 | Otsuka et al. |
| 2004/0019563 A1 | 1/2004 | Sines et al. |
| 2004/0031856 A1 | 2/2004 | Atsmon et al. |
| 2004/0049702 A1 | 3/2004 | Subramaniam et al. |
| 2004/0111369 A1 * | 6/2004 | Lane et al. ..................... 705/40 |
| 2004/0117409 A1 | 6/2004 | Scahill et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0120180 A1 | 6/2005 | Schornbach et al. |
| 2005/0193056 A1 | 9/2005 | Schaefer et al. |
| 2005/0278641 A1 | 12/2005 | Mansour et al. |
| 2006/0274970 A1 | 12/2006 | Seki et al. |
| 2007/0019806 A1 | 1/2007 | Conley et al. |
| 2007/0178882 A1 * | 8/2007 | Teunissen et al. ............ 455/411 |
| 2007/0203850 A1 | 8/2007 | Singh et al. |
| 2007/0234408 A1 | 10/2007 | Burch et al. |

FOREIGN PATENT DOCUMENTS

| | | |
|---|---|---|
| EP | 0855659 | 7/1998 |
| EP | 0884877 | 12/1998 |
| EP | 0917119 | 5/1999 |
| EP | 1014318 A2 | 6/2000 |
| EP | 1022664 | 7/2000 |
| EP | 1056043 | 11/2000 |
| EP | 1089516 | 4/2001 |
| EP | 1471708 A2 | 10/2004 |
| JP | H10-187467 | 7/1998 |
| JP | 200324329 | 11/2000 |
| JP | 2001134672 | 5/2001 |
| JP | 2005-242976 | 9/2005 |

(56) References Cited

FOREIGN PATENT DOCUMENTS

| WO | WO 97/43736 | 11/1997 |
|---|---|---|
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 0188659 | 11/2001 |
| WO | WO 02/17082 A1 | 2/2002 |
| WO | WO 2004/079603 | 9/2004 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
Java, Banking on Java(TM) Technology, java.sun.com, May 21, 1999.
Fusaro, Roberta, Builders Moving to Web tools Computerworld, Nov. 16, 1998, vol. 32, No. 46, pp. 51, 53.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Seibert, Paul, Facilities Planning & Design for Financial Institutions Bankline Publications, 1996, ISBN: 1-55738-780-X.
Owens, David, Facilities Planning & Relocation RSMeans, 1993, ISBN: 0-87629-281-3.
Maize, Fannie Mae on the Web, Doucment ID: 52079, May 8, 1995.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Knowles, Improved Internet Security Enabling On-Line Commerce, PCWeek, vol. 12, No. 11, ISSN: 0740-1604, Mar. 20, 1995.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
Java, Java (TM) Technology in the Real World, java.sun.com, May 21, 1999.
Java, Java(TM) Remote Method Invocation (RMI) Interface, java.sun.com, 05/32/1999.
Java, Java(TM) Servlet API, java.sun.com, May 21, 1999.
Frank, John N. Frank, Beyond Direct Mail, Credit Card Management, vol. 9, Iss. 5, Aug. 1996, 4pgs.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Mitchell, Netlink Goes After an Unbanked Niche, Card Technology, ISSN: 1093-1279, Sep. 1999, p. 22.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Markerplace for Construction Industry, Primavera Ships P3, version 3.0, www.purchasepro.com/, Sep. 21, 1999, pp. 1-3.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
Safe Single-Sign-On Protocol with Minimal Passwork Exposure No Decryption and Technology Adaptivity, IBM Corporation, TDB 03-95, Order 95A, Mar. 1, 1995, pp. 245-248.
Deckmyn, Dominique, San Francisco manages $45M project via web-based Service, Computerworld, Aug. 9, 1999, vol. 33, No. 32, p. 14.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Mosig, Richard, Software Review: the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Java, Staying in Touch with JNDI, java.sun.com, May 21, 1999.
Summary of the At Your Request Architecture, First USA Bank Confidential and Proprietary, Apr. 2, 1999, pp. 1-8.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, 03-93. Order 93A 60636, Mar. 1, 1993, pp. 451-454.
Java, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
OMG, Welcome to OMG's CORBA for Beginners Page!, www.omg.co, May 25, 1999.
OMG, What is CORBA?, www.omg.com, May 25, 1999.

(56) References Cited

OTHER PUBLICATIONS eCharge, eCharge Corporation, www.echarge.com, Dec. 3, 1999.
Federal Financial Institutions Examination Council, *Authentication in an Electronic Banking Environment*, Aug. 8, 2001, pp. 1-12.
Federal Financial Institutions Examination Council, *Authentication in an Internet Banking Environment*, Oct. 12, 2005, pp. 1-14.
Federal Financial Institutions Examination Council, *Supplement to Authentication in an Internet Banking Environment*, Jun. 28, 2011, pp. 1-12.

* cited by examiner

SYSTEMS AND METHODS FOR MULTIFACTOR AUTHENTICATION

RELATED APPLICATIONS

This application is a continuation of U.S. application Ser. No. 11/610,289 filed Dec. 13, 2006, which claims priority to U.S. Provisional Application Ser. No. 60/830,672 filed Jul. 14, 2006, both of which are incorporated herein by reference in its their entirety.

BACKGROUND OF THE INVENTION

Authenticating people, particularly remotely, has been a difficult operation to make resistant to attack. Since single authenticating techniques are vulnerable to theft, it has become attractive to various groups to devise ways to do multifactor authentication, where more than one of (something you have, something you know, something you are) is used in demonstrating the identity of a person whose identity is to be established.

Typically, doing this has involved using relatively complex or expensive devices such as cards with keyboards on them (where you authenticate to the card and then use it), fingerprint readers, or digital certificates requiring public/private encryption to validate that the presenter is in possession both of a password and of a private key.

All this complexity has delayed widespread use of such systems, since the cost of giving out hundreds of millions of copies of devices has been kept high by the need to authenticate two or more things, as well as by the cost of building the system components themselves.

The invention addresses these problems and others that are present in known systems.

SUMMARY OF THE INVENTION

The invention provides a method for performing an authentication (and a system for performing the method), in conjunction with a transaction, utilizing a primary channel and a secondary channel. The method may include an authenticating entity, such as a bank, (1) receiving from a customer primary authentication information via a primary channel; (2) the authenticating entity processing the primary authentication information, and retrieving customer information based on the primary authentication information; (3) the authenticating entity transmitting secondary authentication information to the customer via a secondary channel, the secondary channel being different than the primary channel; (4) the authenticating entity receiving from the customer at least a portion of the secondary authentication information; and (5) the authenticating entity performing authentication processing on the secondary authentication information received from the customer. Based on the successful authentication of the primary authentication information and the secondary authentication information received from the customer, the authenticating entity approves the customer for the transaction.

BRIEF DESCRIPTION OF THE DRAWINGS

The present invention can be more fully understood by reading the following detailed description together with the accompanying drawings, in which any like reference indicators are used to designate like elements, and in which.

DETAILED DESCRIPTION OF THE INVENTION

Hereinafter, various aspects of embodiments of the invention will be described. As used herein, any term in the singular may be interpreted to be in the plural, and alternatively, any term in the plural may be interpreted to be in the singular.

What is proposed here is a system and method which provides a form of two factor authentication which resists fraud. The invention can be supported using relatively very simple hardware and/or existing hardware.

More specifically, the invention provides methods and systems for performing an authentication, in conjunction with a transaction. Embodiments of the invention utilize a primary channel and a secondary channel. In accordance with one embodiment of the invention, a primary authentication is performed on the primary channel. In addition, a secondary authentication is performed on a secondary communications, i.e., the secondary authentication relies at least in part on a secondary communication channel. Thus, security is offered by the entities indeed possessing the devices to communicate on both the first channel and the second communications, as well as the information needed to effect such communications. Various details are set forth below.

Figure 1:
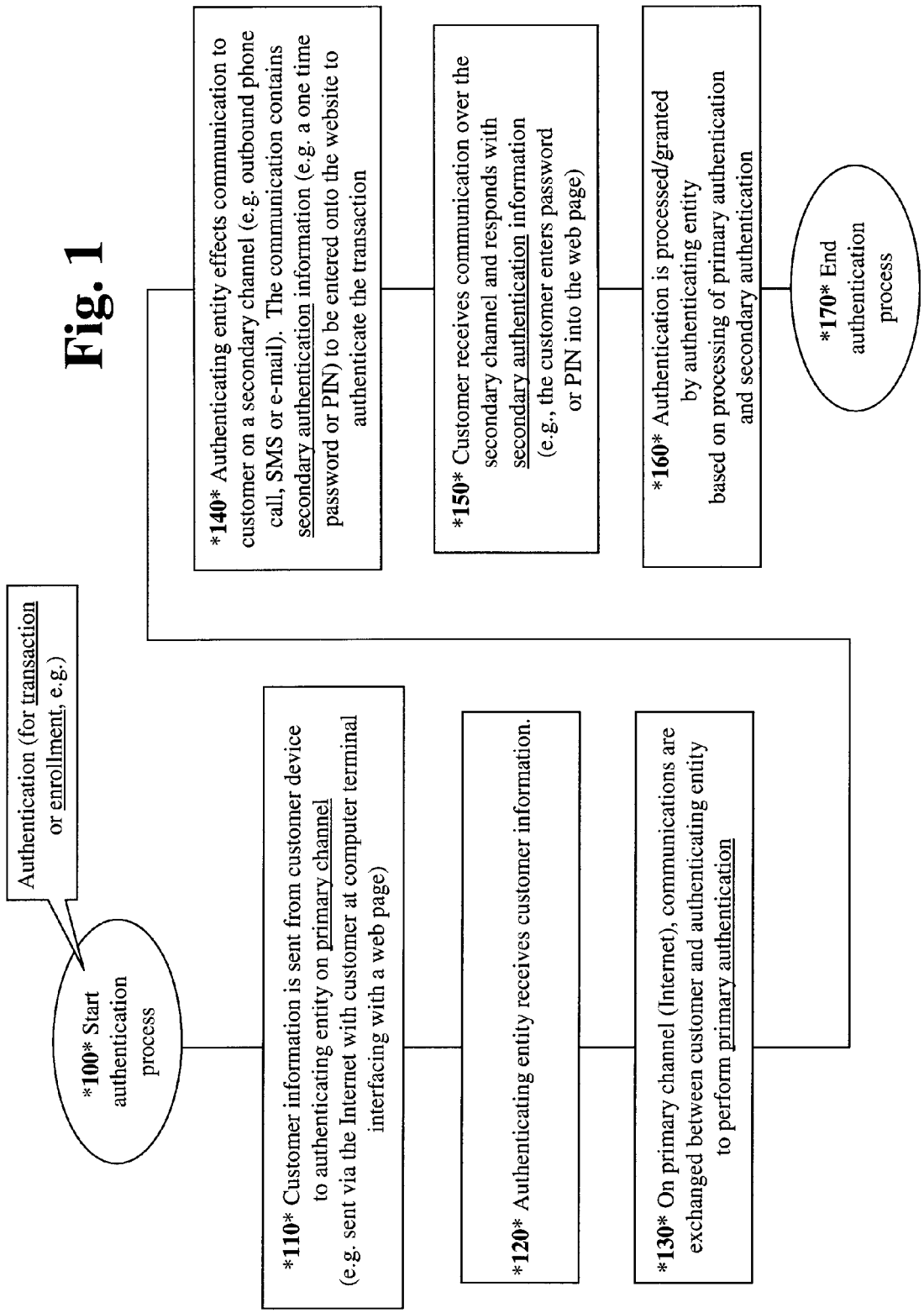
FIG. 1 is a flow chart generally showing an authentication process in accordance with one embodiment of the invention.

As described herein, the invention utilizes a primary authentication (or first authentication) on a first communication channel and a secondary authentication (or second authentication) on a secondary communication channel, the first channel being different than the second. It should be well appreciated what is generally known as a "different" communication channel to one of ordinary skill in the art. For example, clearly a land phone communicating with another land phone over telephone lines is a different communication channel vis-à-vis two computers communicating over an internal network. However, for purposes of definition as described herein, a "different communication channel" means that a first communication channel between two entities utilizes either different information or a different device (or both different information and a different device) vis-à-vis another communication channel. Thus, for example, a computer using a dial-up connection via the telephone line is considered a different communication channel vis-à-vis a telephone using the same telephone line, i.e., (1) the computer is a different device vis-à-vis the telephone set, and (2) the computer uses a URL (for example) vis-à-vis a telephone number. Commonly, the use of different devices goes hand in hand with different information needed to use such devices. In accordance with one aspect of the invention, the security provided by the two channel authentication described herein resides in that different information (and different devices) are needed to communicate over a first channel vis-à-vis a second channel. Such mandates that the communicating entities both are in possession of the devices to perform such communications, and are also in possession of the information to utilize such devices. In further explanation, FIG. 1 is a flow chart generally showing an authentication process in accordance with one embodiment of the invention. As illustrated, the authentication process starts in step 100 and passes to step 110. In step 110, customer information is sent from a customer device to the authenticating entity on a primary channel (e.g. sent via the Internet with the customer at a computer terminal—interfacing with a web page). In step 120, the authenticating entity receives the customer information. Then the process passes to step 130.

Step 130 shows that, on the primary channel (such as the Internet), communications are exchanged between customer and authenticating entity to perform a primary authentication. For example, this step might include the customer providing a user name and PIN, and the bank verifying the submitted user name and PIN.

Then, in step 140, the authenticating entity effects a communication to the customer on a secondary channel. For example, the authenticating entity (bank) makes an outbound phone call, sends a SMS (short message service) message or sends an e-mail to the customer. Such customer contact information might be pulled from the authenticating entity database. The customer may also be contacted as to which secondary channel is preferable to them. Thus, the out-bound call, or other communication from the bank, is effected on a secondary channel.

The communication from the authenticating entity to the customer on the secondary channel contains secondary authentication information. This secondary authentication information might be in the form of a one-time password or PIN. Once received, the customer enters the one-time password or PIN onto the website, in accordance with one embodiment of the invention.

That is, in step 150, in accordance with one embodiment of the invention, the customer receives a communication over the secondary channel and responds by submitting the secondary authentication information to the authenticating entity via the primary channel (e.g., the customer enters the password or PIN into the web page of the bank).

Then, the process passes to step 160. In step 160, the authentication request is processed based on the primary authentication and the secondary authentication. That is, the authentication information from the customer is compared with authentication information maintained by the authenticating entity. In this example, the authentication is verified.

Accordingly, in step 170, the authentication process, being successful, is terminated. Thereafter, for example, the requested transaction is processed, i.e., the merchant is given approval, or some other requested action is performed.

Figure 2:
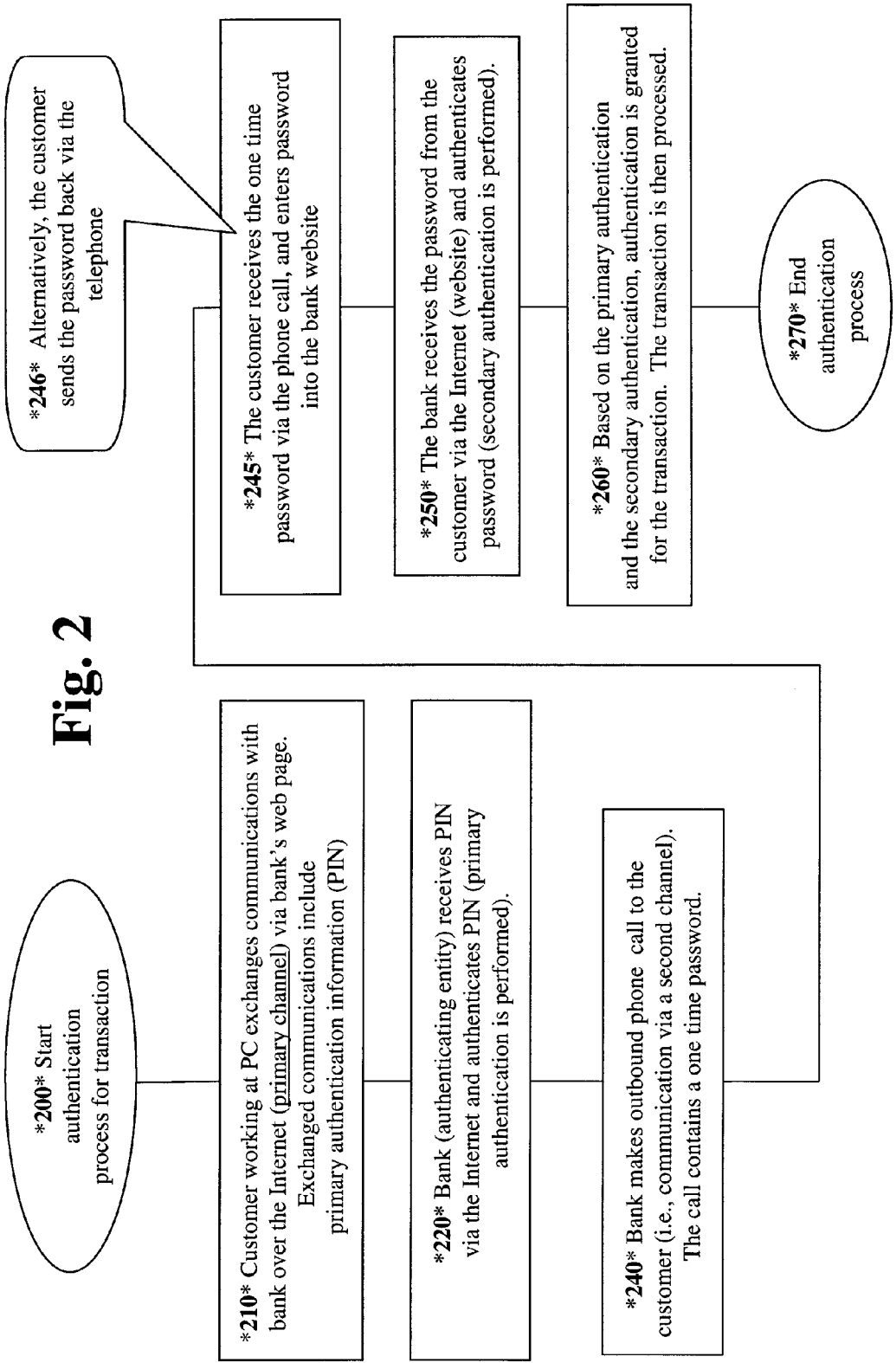
FIG. 2 is a flow chart generally showing a further authentication process in accordance with one embodiment of the invention.

FIG. 2 is a further flow chart showing an authentication process in accordance with one embodiment of the invention. While similar to the process of FIG. 1, FIG. 2 shows further specifics of one embodiment.

As shown, the process of FIG. 2 starts in step 200 and passes to step 210. In step 210, a customer working at a PC (personal computer) exchanges communications with a bank over the Internet via the bank's web page. The Internet is thus the primary channel in this example. The exchanged communications over the primary channel include primary authentication information such as a PIN. In step 220, the bank (i.e., an authenticating entity) receives the PIN via the Internet and authenticates the PIN, i.e., a primary authentication is performed.

Then, in step 240, the bank makes an outbound phone call to the customer (i.e., effects a communication via a second channel). In accordance with this embodiment of the invention, the call contains a one time password. Then, in step 245, the customer receives the one time password via the phone call from the bank. The customer then enters the password into the bank website. Alternatively, the customer might be instructed to call the bank and receive the password in some suitable manner. That is, in some manner, the customer would advise the bank of the customer's identity, and the bank in turn would provide the one-time password.

FIG. 2 also shows an alternative embodiment in which the customer the customer sends the password back via the telephone, i.e., instead of the customer conveying the password back to the bank via the Internet (the primary channel). For example, the customer might receive the phone call with the one-time password, and the phone call message advises the client to call back on a separate number. Alternatively, the phone call might prompt the customer to enter back the password that has just been provided to the customer. Such embodiment (over the secondary channel) would confirm that there was indeed a person at the called number, and that the person repeated back the password, which was provided to him.

Returning now to step 245 of FIG. 2, after step 245, the process passes to step 250, as shown in FIG. 2. In step 250, the bank receives the one-time password from the customer via the Internet, such as via the banks website, for example. The bank then authenticates the one time password (i.e., a secondary authentication is performed). In step 260, based on the primary authentication and the secondary authentication, authentication is granted for the transaction such that the desired transaction is authorized. The transaction is then processed. In step 270, the authentication process ends.

Figure 3:
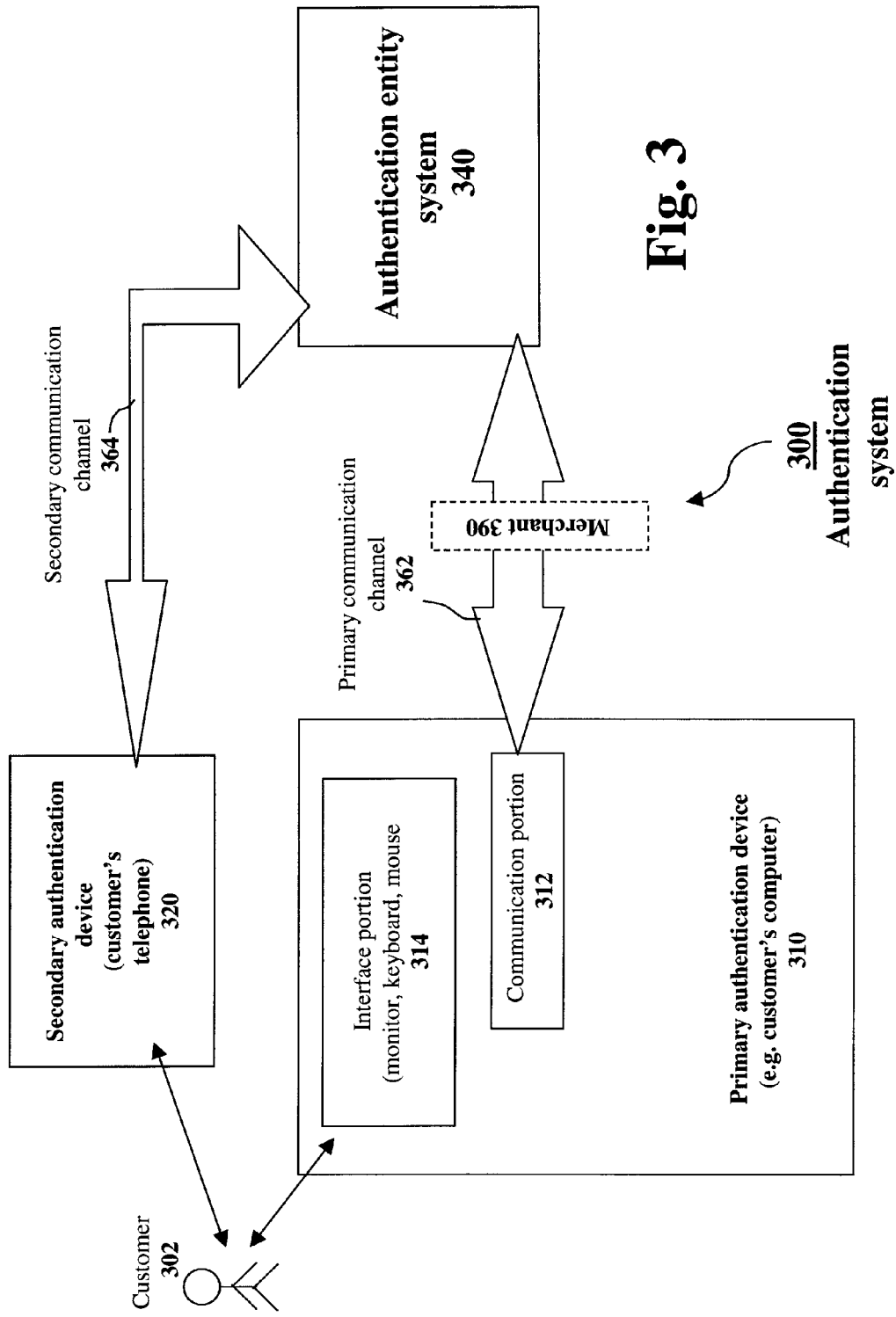
FIG. 3 is a block diagram showing an authentication system in accordance with one embodiment of the invention.

FIG. 3 is a block diagram showing an authentication system 300 in accordance with one embodiment of the invention. The authentication system 300 includes a primary authentication device 310 and a secondary authentication device 320. Both the primary authentication device 310 and the secondary authentication device 320 interface with a user 302, i.e., a customer 302. For example, the primary authentication device 310 may be in the form of a personal computer (of the user) with access to the web, for example. On the other hand, the secondary authentication device 320 may be in the form of a telephone of the user, for example. The authentication entity system 340 may be a bank with a bank processing platform, for example. The authentication system 300 may be used to practice the various embodiments of the invention as described herein.

As shown in FIG. 3, the primary authentication device 310 includes an interface portion 314. The interface portion 314 may be in the form of a monitor with keyboard and mouse, for example, i.e., the user interface of a computer. The primary authentication device 310 may further include a communication portion 312. The communication portion 312 may be in the form of an Internet connection, e.g., a modem or other interface.

In this example, the primary authentication device 310 communicates with the authentication entity system 340 over the primary communication channel 362, i.e., the Internet. On the other hand, the secondary authentication device 320 communicates with the authentication entity system 340 over the secondary communication channel 364, i.e., in this example, telephones communicating over a standard phone network.

Figure 4:
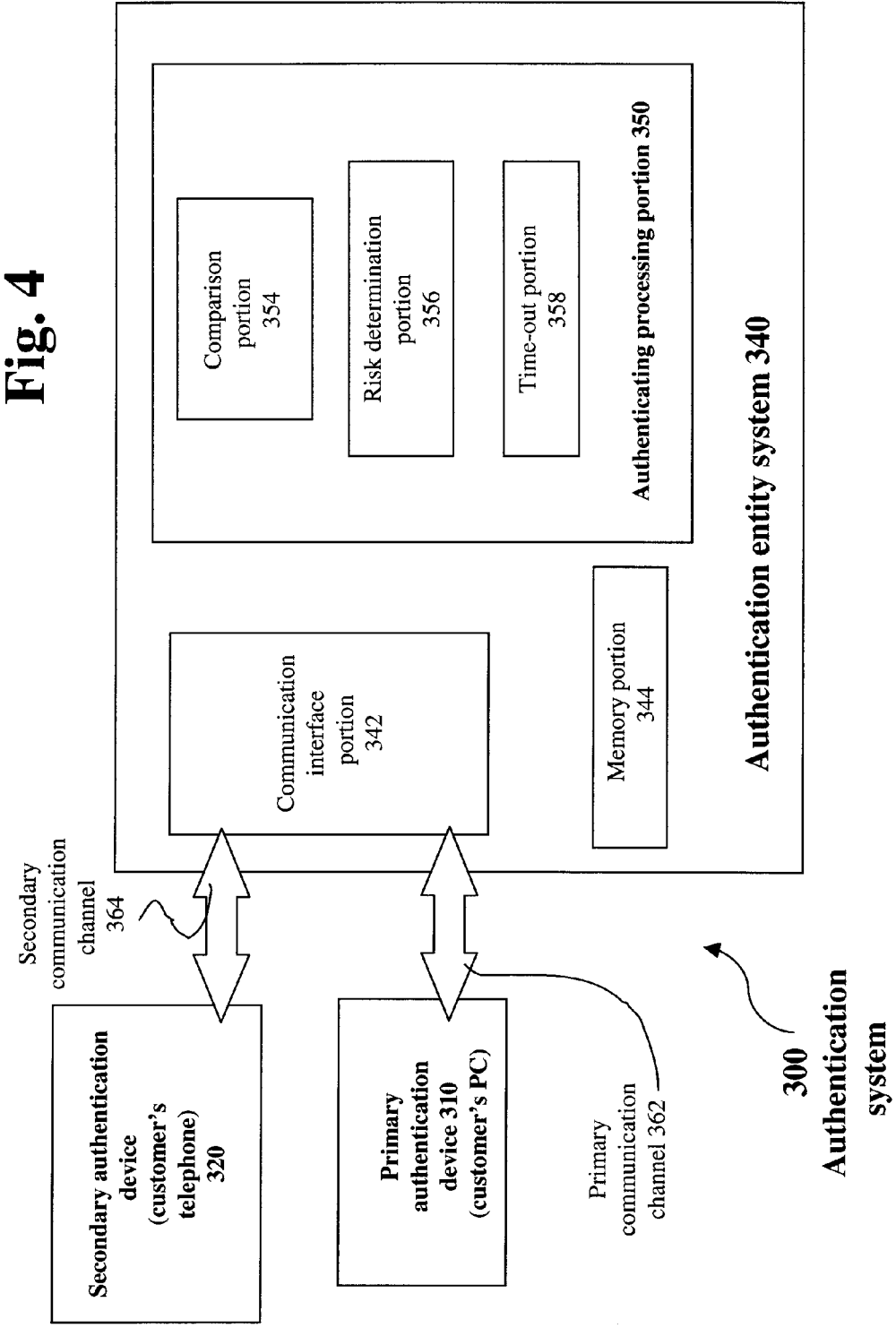
FIG. 4 is a block diagram showing further details of the authentication system of FIG. 3, and in particular the authentication entity system, in accordance with one embodiment of the invention.

FIG. 4 is a block diagram showing further details of the authentication entity system 340 of FIG. 3, in accordance with one embodiment of the invention. The authentication entity system 340 includes a communication interface portion 342 and a memory portion 344. The communication interface portion 342 interfaces with the communication channels 362, 364 so as to communicate data, i.e., such as authentication information, with the primary authentication device 310 and the secondary authentication device 320. Accordingly, the communication interface portion 342 is provided with the functionality to interface with a variety of channels, such as an Internet interface and telephony interface, for example. The memory portion 344 serves as a database to store various data associated with, and needed by, operation of the authentication entity system 340, i.e., such as customer information. For example, when a username and password comes in from a customer on the primary channel, the authenticating entity may pull the customer's phone number, or other contact information, from the memory portion 344. The customer's phone number is then used, in this example, to forward a one-time password to the customer via the secondary communication channel 364, in accordance with one embodiment of the invention.

The authentication entity system 340 also includes an authenticating processing portion 350. The authenticating processing portion 350 performs various processing of the authentication entity system 340. In particular, the authenticating processing portion 350 includes a comparison portion 354. The comparison portion 354 performs a comparison between submitted authentication information and information that is on file with the authenticating entity, i.e., stored in the memory portion 344. Based on such comparison, the comparison portion 354 either denies the transaction, approves the transactions, or moves the processing to the next step in the authentication. The authentication processing is performed on the primary authentication, as well as the secondary authentication.

The authenticating processing portion 350 further includes a risk determination portion 356. The risk determination portion 356, in accordance with one embodiment of the invention, is used by the authenticating processing portion 350 to determine the risk associated with a particular transaction. For example, the risk determination portion 356 might flag the transaction if the dollar amount is sufficiently high and/or if the transaction is through a particular merchant, for example. However, as desired, any criteria might be used to flag a particular transaction. For example, criteria relating to the particulars of the customer might be used. Accordingly, the secondary authentication (over the secondary communication channel 364) might only be used if the transaction is flagged by the risk determination portion 356. With un-flagged transactions, e.g., transactions with a low dollar amount, the authentication entity system 340 may rely only on processing (including authentication) over the primary communication channel 362.

The authenticating processing portion 350 further includes a time-out portion. The time-out portion monitors the time elapsed during a complete authentication process. In particular, the time-out portion monitors the time between the primary authentication and the secondary authentication. The measurement of elapsed time may work off any particular event or events in the authentication process. For example, the time-out portion might measure the time between when a PIN is received from the customer (in conjunction with the primary authentication) vis-à-vis when the customer submits secondary authentication information. However, any other suitable events might be used. Further aspects of the time-out portion are described below.

Figure 5:
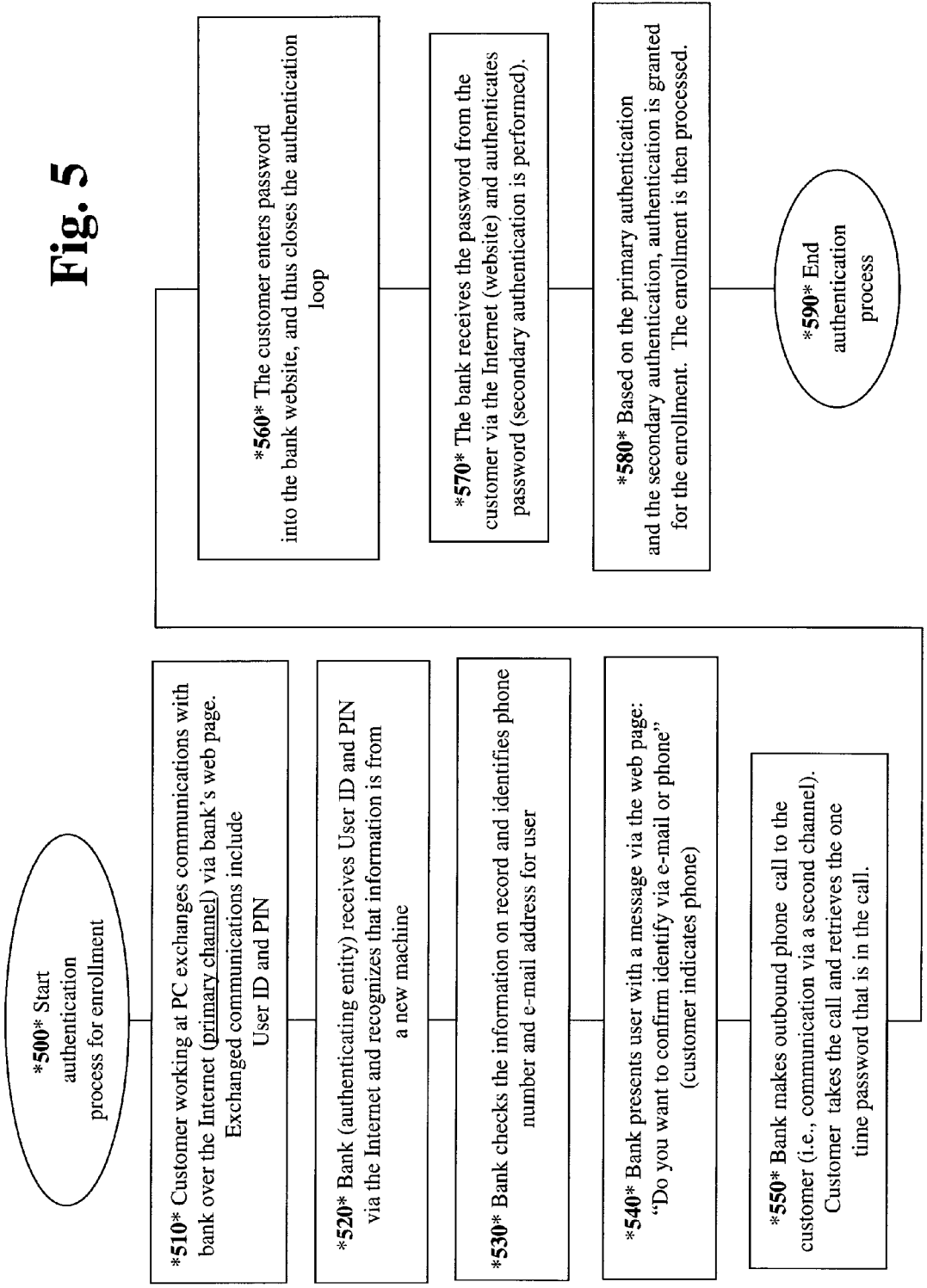
FIG. 5 is a further flow chart showing an enrollment authentication process in accordance with one embodiment of the invention.

FIG. 5 is a flow chart showing specifics of a further authentication process in accordance with one embodiment of the invention. In particular, the process of FIG. 5 relates to enrollment of a customer in a service offered by the authenticating entity. FIG. 5 shows the various steps in such enrollment process.

The illustrative process of FIG. 5 starts in step 500. Then in step 510, a customer working at his computer exchanges communications with the bank, over the Internet, via the bank's web page. Accordingly, in this example, the Internet is the primary channel. The exchanged communications between the customer and the bank include the customer's User ID and PIN. That is, in this example, the user, who wishes to enroll in a service, is an existing customer of the bank who possesses a User ID and PIN. For example, the service might be newly offered by the bank.

After step 510, the process passes to step 520. In step 520, the bank, i.e., the authenticating entity, receives the User ID and PIN (submitted by the customer) via the Internet and recognizes that information is from a new machine. That is, for that particular service, the bank has not seen the user's computer. However, the bank does recognize the user as a customer.

In step 530, the bank then checks the information on file for that particular customer, i.e., to authenticate the User ID and PIN. Also, the bank checks what contact information the bank has on file for that particular customer. In this example, the bank determines, based on a check of the bank's records, that the user has an e-mail address and a telephone number.

Then, the process passes to step 540. In step 540, the bank generates and presents the user with a message regarding which mode of communication, i.e., upon which communication channel, the user would like to perform the secondary authentication. For example, the bank presents the user, on the user's computer, with a message:

"DO YOU WANT TO CONFIRM IDENTITY VIA E-MAIL OR PHONE"

In this example, the customer responds that he would like to confirm identity via telephone. Accordingly, in step 540, the bank makes an outbound phone call to the customer. That is, the bank initiates a secondary authentication on a secondary channel. Then, the customer takes the call and retrieves the one time password that is in the call. For example, an automated voice-message system managed by the bank might verbally convey the one time password.

The process then passes to step 560. In step 560, the customer enters the password, obtained via the telephone call from the bank to the customer, into the bank website.

In step 570, the bank receives the password from the customer via the Internet (the bank website) and authenticates the password, i.e., the secondary authentication is performed by the bank. Then in step 580, based on the primary authentication and the secondary authentication, authorization is granted for the enrollment. As a result, the authentication loop, operating over two channels is closed. Based on the authentication of the customer, the enrollment is then processed. In step 590 of FIG. 5, the process ends.

As described herein, various schemes are utilized to authenticate the customer (e.g. individual/entity) to an authenticating entity, such as a bank. It is appreciated that in conjunction with the processes of the embodiments described herein, it may be needed or desired for the authenticating entity to authenticate to the customer. For example, a caller identification (caller ID) might be used such that the customer knows that the authenticating entity is calling. Illustratively, the customer may be on-line and doing a purchase. In accordance with the embodiments discussed herein, the bank calls the customer, i.e., the system sends a call to the customer (on the home phone of the customer) with the one time password. The caller ID on the customer's phone may be provided to come up as the authenticating entity, e.g. Chase Bank. Other arrangements may be used to authenticate the authenticating entity (e.g. bank) to the customer. On the other hand, caller ID might also be used to authenticate the customer, such as authenticating the customer's cell phone (prior to receiving instructions from such cell phone).

Figure 6:
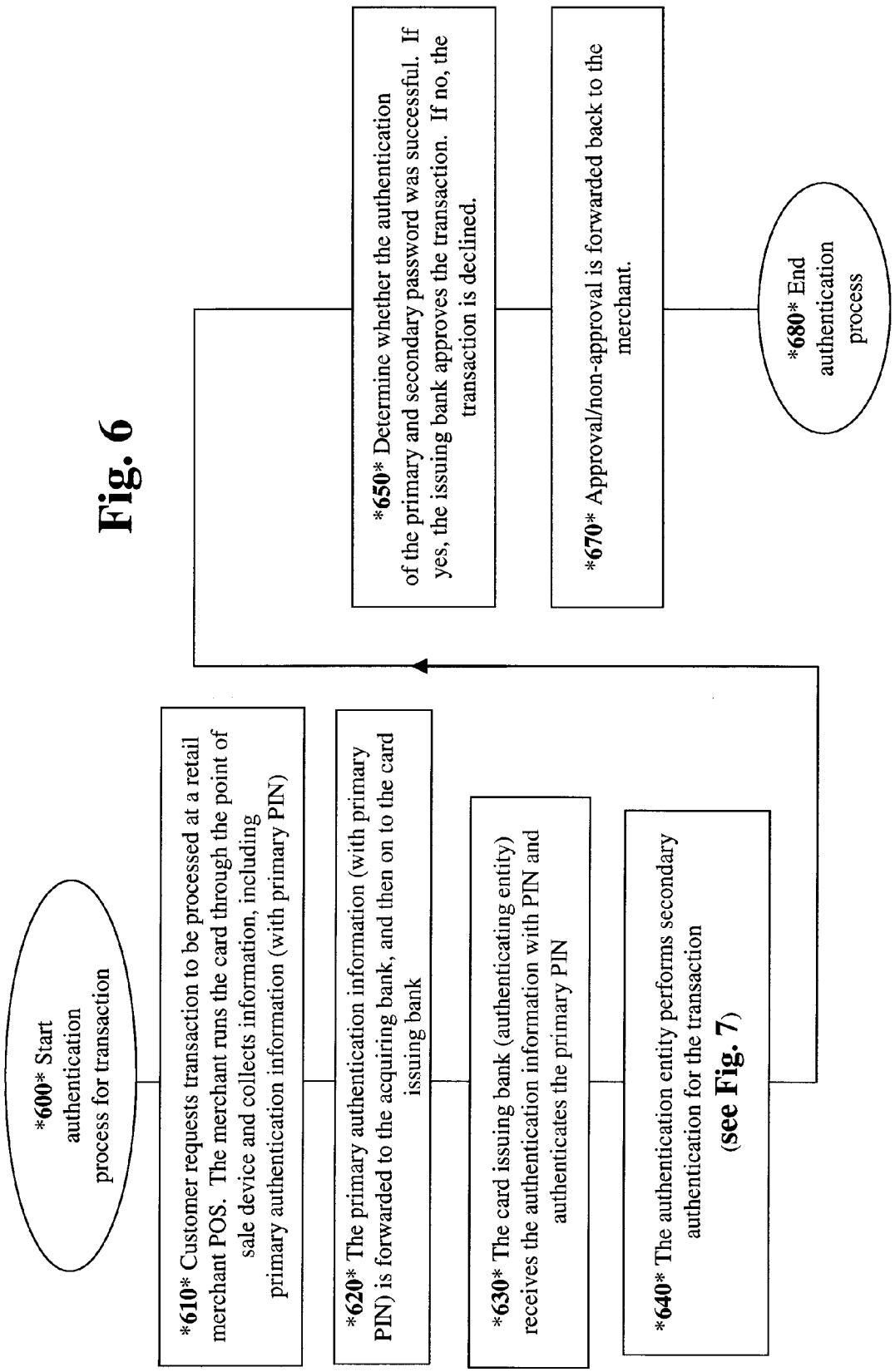
FIG. 6 is a flow chart showing an authentication process utilizing multiple transaction approvers in accordance with one embodiment of the invention.

FIG. 6 is a flow chart showing an authentication process utilizing multiple transaction approvers in accordance with one embodiment of the invention. Each of the multiple transaction approvers may be associated with one or more authentication devices. That is, in this embodiment, multiple persons are contacted (on the secondary channel) to seek approval of the transaction.

As shown in FIG. 6, the process starts in step 600 and passes to step 610. In step 610, the customer requests a transaction to be processed at a retail merchant POS (point-of-sale). The merchant runs the card through the point of sale device and collects information from the customer, for example from the customer and/or the card itself. This information includes the primary authentication information, with the primary PIN. Then, in step 620, the primary authentication information (with primary PIN) is forwarded to the acquiring bank that is associated with the particular merchant, and then on to the card issuing bank that is associated with the particular card that the customer is using. The process passes to step 630.

In step 630, the card issuing bank (authenticating entity) receives the authentication information with PIN and authenticates the primary PIN. Then, in accordance with this embodiment, in step 640, the authentication entity performs secondary authentication for the transaction. Further details of step 640 are shown in both FIGS. 7 and 8. After step 640, the process passes to step 650.

In step 650, the process determines whether the authentication of the primary and secondary password was successful. If yes, the issuing bank approves the transaction. If no, the transaction is declined. Then in step 670, the approval/non-approval is forwarded back to the merchant. The transaction is then completed, i.e., the sale is made or the transaction is terminated. In step 680, the authentication process ends.

As noted above, FIG. 7 is a flowchart showing further details of the secondary authentication, performed in the process of FIG. 6, in accordance with one embodiment of the invention. The subprocess begins in step 640 and passes to step 642.

In step 642, the authenticating entity bank retrieves account data from its records. The account data includes particulars of the account, including secondary authentication rules. The secondary rules may vary as desired. For example, the secondary rules may designate a dollar amount at which the secondary authentication will be invoked, particulars of the secondary authentication and the transaction approver(s) associated with the secondary authentication, which transaction approvers are contacted under what circumstances, and/or any other desired criteria.

Figure 7:
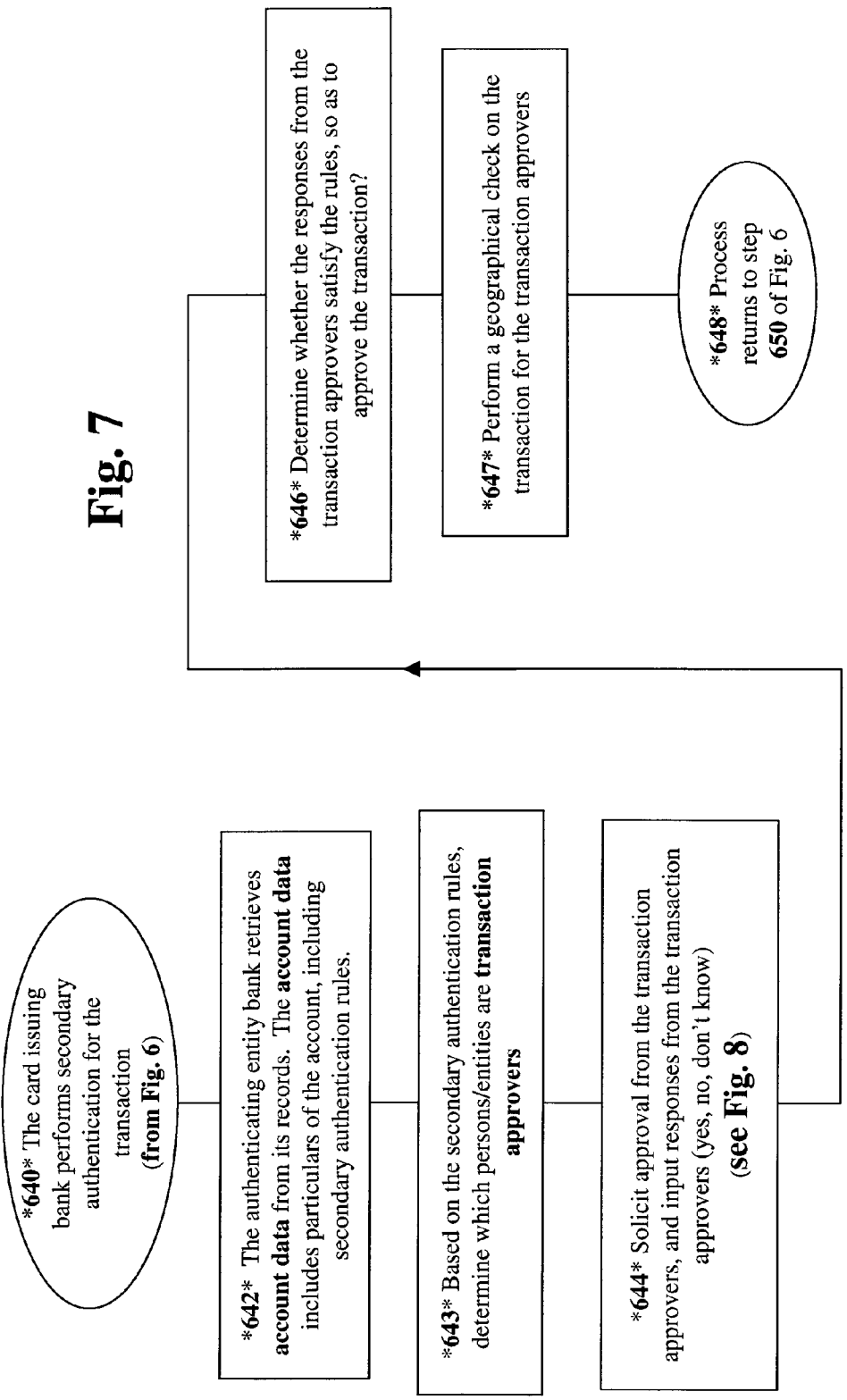
FIG. 7 is a flowchart showing further details of the secondary authentication, performed in the process of FIG. 6, in accordance with one embodiment of the invention.
Figure 8:
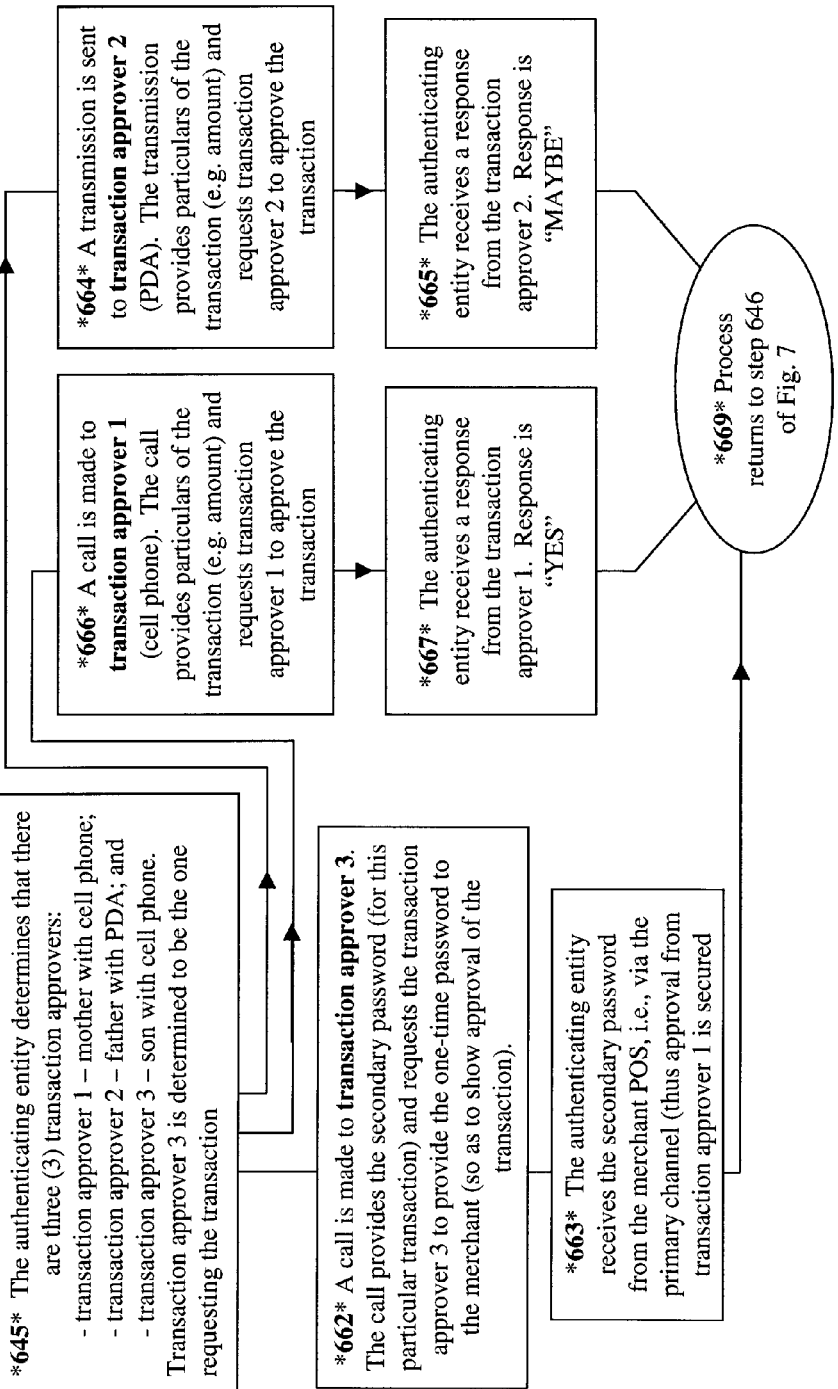
FIG. 8 is a flowchart showing aspects of soliciting approval from multiple transaction approvers, performed in the process of FIG. 7, in accordance with one embodiment of the invention.

In the example of FIG. 7, in step 643, the process, based on the secondary authentication rules, determines which persons and/or entities are transaction approvers for the requested transaction associated with the particular card. Accordingly, in step 644, the process solicits approval from the transaction approvers, i.e., forwards respective communications to the transaction approver requesting their approval of the requested transaction. The authenticating entity then inputs responses from the transaction approvers. The responses may include YES, NO, or DON'T KNOW, for example. Further details of step 644 are illustrated in the flowchart of FIG. 8.

After step 644 of FIG. 7, the process passes to step 646. In step 646, the process determines whether the responses from the transaction approvers satisfy the rules, so as to approve the transaction. Such determination determines whether the secondary authentication will be successful or not.

Then, the process passes to step 647. In step 647, a geographical check is performed on the transaction for the transaction approvers. That is, as described below, a plurality of transaction approvers are contacted to determine if they approve of the transaction. In conjunction with such communications, the authenticating entity may also perform a further check on the validity of the requested transaction. This further check uses geographical information regarding the transaction approver devices, and where they are located, in conjunction with other particulars of the transaction devices. The further check, in short, performs an analysis to determine (based on what the authenticating entity knows) could the requested transaction legitimately take place. For example, assume each of the transaction approvers utilizes a cell phone, and that each have indicated they want to be contacted on their cell phone for any requested secondary authentication. In the course of communications with the transaction approvers, the authenticating entity can determine the geographical location of their respective cell phones. If none of the transaction approvers are at a location of the transaction, then the transaction may be denied. For example, if all the transaction approvers are on the east coast (as determined by the location determination of the cell phones) and the transaction is on the west coast (as determined from knowledge about the merchants point-of-sale), such suggests the transaction is fraudulent. It is appreciated that tolerances and exceptions may be utilized as desired. For example, exceptions might be provided for slight variations in geographical location, i.e., of a POS vis-à-vis authentication devices, for example.

After step 647 of FIG. 7, the process passes to step 648. In step 648, the process returns to step 650 of FIG. 6.

FIG. 8 is a flowchart showing aspects of soliciting approval from multiple transaction approvers, performed in the process of FIG. 7, in accordance with one embodiment of the invention. In this example, responses may include (YES, NO, or DON'T KNOW).

After starting in step 644, the subprocess of FIG. 8 passes to step 645. In step 645, the authenticating entity determines that, in this particular example, there are three (3) transaction approvers:

(1) transaction approver 1 is a mother with a cell phone;
(2) transaction approver 2 is the father with a PDA; and
(3) transaction approver 3 is a son with a cell phone.

Further, the authenticating entity determines that transaction approver 3 is the transaction approver that is indeed requesting the transaction. It should be noted that is not needed that the authenticating entity determine which transaction approver is indeed requesting the transaction. Rather, such may be suitably controlled by the rules that are in place.

FIG. 8 then shows the authenticating entity contacting each of the transaction approvers in parallel. The authenticating entity first contacts transaction approver 3, i.e., the son with a cell phone, who requested the transaction. That is, in step 662 of FIG. 8, the authenticating entity calls transaction approver 3. The call provides the secondary password (for this particular transaction) and requests the transaction approver 3 to provide the one-time password to the merchant (so as to show approval of the transaction). Then, in step 663, the transaction approver 1 has submitted the one-time password, i.e., the secondary password, to the merchant POS, and the authenticating entity receives the secondary password from the merchant POS, i.e., via the primary channel (thus approval from transaction approver 3 is secured).

In parallel to securing the approval of transaction approver 3, the authenticating entity also seeks out the approval of transaction approvers 1 and 2.

That is, in step 666 a call is made to transaction approver 1 (cell phone). The call provides particulars of the transaction (e.g. amount) and requests transaction approver 1 to approve the transaction. In step 667, the authenticating entity receives a response from the transaction approver 1, and the response is "YES".

Also, in step 664, a transmission is sent to transaction approver 2 (who uses a PDA). The transmission provides particulars of the transaction (e.g. amount) and requests that transaction approver 2 approve the transaction. In step 665, the authenticating entity receives a response from the transaction approver 2. The response is "MAYBE". Then in step 669, the process returns to step 646 of FIG. 7.

As described above, in step 646, the authenticating entity determines whether the responses from the transaction approvers satisfy the rules, so as to approve the transaction. In this example, transaction approver 3 and transaction approver 1 both indicated yes, while transaction approver 2 indicated maybe, i.e., indicating that transaction approver 2 is neutral. Thus, in this example, the rules are satisfied, and the transaction is approved. As noted herein, any suitable set of rules may be utilized based on various factors. For example, the rules may dictate that all the transaction approver will be contacted only of the dollar amount is above a certain amount. In general, the rules may control which transaction approvers are contacted under which conditions. For example, the rules may only require that only one parent respond affirmatively to a requested transaction.

As described above, the transaction approvers are contacted "in parallel." However, such is not needed to be the case. The transaction approvers might be contacted in turn, i.e. in serial fashion based on a suitable rule set. Indeed, the rules may provide for a hierarchy of transaction approvers. That is, one transaction approver might be contacted after which the process is not continued till the authenticating entity receives a YES response from that transaction approver (or alternately a MAYBE or DON'T KNOW response might be required before moving on to the next transaction approver). Such hierarchical processing might be used in conjunction with the processing of FIG. 8, e.g. the approval of one transaction approver might be required before contacting the other transaction approvers in parallel (that is, the other transaction approvers are contacted in parallel to each other, but only after the first transaction approver has approved the transaction. It is appreciated that variations of such processing may be used, as is desired.

Various geographic related authentication techniques have been described herein. The invention may also utilize a geographic check performed for computers on the Internet. That is, a geographic check may be performed to determine where a customer's computer is (who is requesting a transaction). Thus, the authenticating entity can tell where the request is coming from. For example, if the authenticating entity (bank) is in an internet banking session and the customer lives in Wilmington, Del., and the request is coming from Russia, a rule set may then direct the system to immediately go into a secondary verification, as described above, or take other appropriate action.

Further, with regard to cell phones, the authenticating entity (or one acting on behalf of the authenticating entity) can determine the location of a cell phone by the tower it is using. Thus, if the authenticating entity determines that the computer the customer is using is in Wilmington, Del. and the location of the cell phone (determined via the secondary authentication) is also in Wilmington, the risk is small that the transaction is fraudulent. However, if the same customer (with the computer in Wilmington) is determined to be calling from a cell phone in Virginia, such scenario identifies that the transaction may be fraudulent. Accordingly, further authentication techniques may be used to dispel the possibility of fraud or decline the transaction.

The systems and methods of embodiments of the invention may be used in any "transaction", including a conveyance of information, in which authentication of a user is needed or desired. Such transaction might include an enrollment, a telephone transaction, Internet transaction (such as an Internet purchase), network transaction, infrared transaction, radio signal transaction, credit card transaction, debit card transaction, smart card transaction, ACH transaction, stock trade transaction, mutual fund transaction, swap, PAYPAL® transaction, BILL ME LATER® transaction, electronic funds transfer transaction, financial application transaction, an arrangement to set up payments to an entity, a verification, an ATM transaction, an identification message verification, and/or a confirmation of identify, for example. For example, such a transaction might include a message from one human user to another human user, a human user communicating with an electronic device, and/or two electronic devices communicating with each other. The transaction may or may not be in a financial context, i.e., for example, the message might be authorizing the opening of a door or the transfer of a non-financial related message, for example.

Any communication channel which carries suitable communications (e.g. as described herein) may be used for either the primary channel or the secondary channel. The use of one channel for the primary authentication information and a different channel for the secondary authentication information (i.e., for at least one transmission of the secondary authentication information, e.g. from the bank to the customer) lends substantial prevention of fraud. Thus, for example, the communications, over their respective channels, may include network communications, Internet communications, SMS communications, text message communications, telephone communications, land-line telephone communications, cell phone communications, RFID communications, satellite communications, e-mail communications, electronic communications, communications via an ATM, VRU (voice-recognition-unit) communications, and/or radio communications, for example.

Further, the communications in the practice of the invention may utilize and be supported by any suitable device including any of telephone, land phone, cell phone, satellite phone, telegraph, fax, beeper, one-way cable TV, one-way satellite, dial-out terminal, on-line terminal, Internet, Intranet or Extranet, SmartPhone, 2-way beeper, pager, Personal Digital Assistant (PDA), Personal Computer (PC), browser, radio transmission device, desktop computer, laptop computer, a buffer storing retrievable data, express mail delivery, commercial express delivery and various systems of-the-type or similar in nature to those mentioned herein. Such lists set forth herein are merely illustrative, and is not exhaustive.

In one embodiment, the invention herein described can be incorporated in payment systems with very minor changes at issuer sites and using mainly existing merchant facilities. For example, the method might use the secondary authentication information, e.g. the one time password, in place of the commonly used CVV code.

As described above with reference to FIG. 2, secondary authentication information is conveyed to the customer via a phone call from the bank to the customer. This secondary authentication information is then conveyed back to the bank via the customer entering the information into a web page. Illustratively, however, the roles of the two channels may of course be reversed, as they may also be reversed in the other embodiments discussed herein. Further, the secondary authentication information might of course be conveyed to the customer in ways other than via a phone call. That is, any suitable channel may be respectively used for either the primary channel and/or the secondary channel.

FIG. 1 for example, as well as other embodiments, show the customer interacting directly with the authenticating entity, e.g. a bank. Such might be the case when enrolling with the bank, when the customer is checking balances on an account, or when the customer transfers funds from one account to another account. However, in the embodiment of FIG. 1, as well as other embodiments, a merchant (or other point of sale (POS)) may be involved in the transaction. For example, FIG. 3 shows that a merchant 390 might be disposed in the primary communication channel 362, i.e., such that communications (e.g. PIN) from the customer pass through the merchant to the authenticating entity. Thus, a merchant may be disposed in the embodiments described herein in any suitable manner.

In accordance with one embodiment of the invention, the primary channel is an Internet website (of the authenticating entity) accessed via a dial-up connection over a telephone line. The secondary channel is a telephone call (with one-time password or code) to the customer over the same telephone line. Thus, the customer must go off-line from the website to receive the telephone call. The customer then goes back online the web site to transmit the secondary authentication information back to the authenticating entity. Accordingly, it is not necessary that the additional verification using the secondary communication channel, i.e., the out-of-band or secondary channel, be concurrent with the communications on the primary communication channel. Thus, for example, communications on the primary channel might take place before and after the secondary authentication information is exchanged on the secondary channel. However, such non-concurrent primary authentication and secondary authentication might take longer. Accordingly, such may be taken into account in the monitoring performed by the time-out portion, described herein. In accordance with one embodiment of the invention, the time-out portion might monitor the particular modes of communication utilized, and adjust allotted time accordingly. In implementation of the invention, it is not needed that numbers be used for either the primary authentication information and/or the secondary authentication information. That is, any of a wide variety of graphics, letters, symbols, gliffs, ruuns, images, biometrics or any other indicia or information, for example, might be used in lieu (or in combination) with numbers. Depending on the nature of the authentication information, point of sale locations might need to be provided with particular devices. However, such would depend on the particular implementation of the invention.

As described above, the customer and the user communicate over a first channel to perform a primary authentication. As can be appreciated, such communication over the primary channel may be effected, and initiated, in any suitable manner. For example, the customer might access a bank's web page, the bank might call the customer, the customer might call the bank, or a bank might send out mailings to targeted customers, for example. As described herein, once the primary authentication is performed on the primary channel, or in conjunction with performing the primary authentication, a communication is established over a secondary channel. As described above the bank might make a telephone call to the customer, thereby providing a one-time password.

As described above, any of a variety of communication channels may be used as the primary channel and the secondary channel. Accordingly, in accordance with one aspect of the invention, a decision process is needed to determine which communication channels should be used. With reference to FIG. 4, the decision process of which communication channel to use may be performed by the authenticating processing portion 350. The particular selection of communication channel may be performed in any suitable manner. For example, the communication channel used might be selected based on accessing the customer's contact information in a suitable database. Alternatively, the communication channel might be manually selected. In regard to the secondary communication channel, such secondary channel might be selected based on information communicated from the client on the primary channel, i.e., the customer might be prompted (on the primary channel) as to what channel to use as the secondary channel.

However, in order to enhance security, it may be desirable for the authenticating entity to provide some integral portion of the information used to effect the secondary authentication over the secondary communication channel. For example, during communication over the primary channel, the bank might ask the user what channel to use as the second channel. In response, the customer might provide a preferred channel, but not the complete information to effect the secondary communications. That is, the customer might be provided with the options (and prompted to select one of):
 <Cell phone>
 <home phone>
 <pager>
However, the customer would not be provided with, nor able to specify, the specifics of such communication channel, e.g., the customer would not be allowed to specify the cell phone number. Rather, upon a selection, the authenticating entity would indeed have the information to effect the desired communications, e.g. the bank would have the phone number or the pager number in its database.

Any of a variety of approaches might be utilized to select the particular channel to be used for the primary channel and/or the secondary channel. For example, the systems and methods disclosed in U.S. Pat. No. 6,535,855 to Cahill et al. and issued Mar. 18, 2003 entitled "PUSH BANKING SYSTEM AND METHOD", incorporated herein in its entirety, might be used to select the first and second communication channels.

It should be appreciated that the various features of the present invention may be used in conjunction with other encryption technology and/or features. In particular, the various features of the present invention may be used in combination with any of the features described in U.S. patent application Ser. No. 11/137,409 filed May 26, 2005, which is incorporated herein by reference in its entirety.

As described above, a primary authentication is performed over a primary channel. Thereafter, a secondary authentication is performed over a secondary channel. That is, at least some portion of the communications to effect the secondary authentication are performed over a secondary channel. In accordance with one aspect of the invention, the proximity in time between performing the primary authentication and the secondary authentication is controlled. That is, if too much time passes between performing the primary authentication vis-à-vis the secondary authentication, the authentication becomes suspect and more at risk for fraud. As a result, the time between the primary authentication and the secondary authentication may be monitored.

For example, the authenticating processing portion 350 may be provided with the time-out portion 358 described above, in accordance with one embodiment of the invention. The time-out portion 358 monitors the time elapsed between the primary authentication vis-à-vis the secondary authentication. If too much time elapses, the time-out portion 358 will cancel the transaction, or in some suitable manner terminate the authentication process. The customer may then be notified in some manner, and asked to restart the transaction in some suitable manner. Accordingly, the authentication entity system 340 may be provided to monitor the time-out portion 358, and re-start the transaction if needed. As described above, the time afforded before a time-out might be variably controlled based on the particular communication channels utilized.

As described above, FIGS. 3 and 4 show embodiments of structure and system of the invention. Further, FIGS. 1, 2 and 5-8 show various steps in accordance with embodiments of the invention. It is appreciated that the systems and methods described herein may be implemented using a variety of technologies. Hereinafter, general aspects regarding possible implementation of the systems and methods of the invention will be described.

It is understood that the system of the invention, and portions of the system of the invention, may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for performing a multifactor authentication between an authenticating entity and a customer remote from the authenticating entity, utilizing a primary communication channel and a secondary communication channel, the method comprising:

receiving from the customer, by a processing machine of the authenticating entity, primary authentication information via the primary communication channel;

processing the primary authentication information by the processing machine of the authenticating entity, and retrieving customer information based on the primary authentication information;

presenting a message to the customer regarding a desired mode of communication through which the customer would like to perform a secondary authentication;

receiving from the customer a selection of the desired mode of communication, which desired mode of communication comprises the secondary communication channel;

transmitting, by the processing machine of the authenticating entity, secondary authentication information to the customer via the secondary communication channel, the secondary communication channel being different than the primary communication channel;

receiving from the customer via the primary communication channel at least a portion of the secondary authentication information;

processing the secondary authentication information received from the customer by the processing machine of the authenticating entity to authenticate the customer; and based on successful authentication of the primary authentication information and receipt of the at least a portion of the secondary authentication information from the customer, the processing machine of the authenticating entity authenticating the customer.

2. The method of claim 1, wherein the primary communication channel is the Internet and the secondary authentication information is transmitted via at least one of a telephone call, text message, or e-mail to the customer.

3. The system of claim 1, wherein the customer uses a first computing device to transmit the primary authentication information to the authenticating entity and a second computing device, different from the first computing device, to transmit the secondary authentication information to the authenticating entity.

4. The method of claim 1, wherein the authenticating entity is a bank.

5. The method of claim 1, wherein processing performed by the authenticating entity includes referring to secondary authentication rules before invoking utilization of the secondary authentication information.

6. The method of claim 5, wherein at least one rule in the secondary authentication rules is based on a dollar amount of a transaction involving the customer.

7. The method of claim 5, wherein at least one rule in the secondary authentication rules is based on a merchant with which the customer is transacting.

8. The method of claim 7, wherein the merchant is identified by a merchant ID received by the processing machine of the authenticating entity.

9. The method of claim 1, wherein the primary authentication information includes a username and password.

10. The method of claim 1, wherein the secondary authentication information includes at least one selected from the group consisting of a one-time password and a one-time authentication code.

11. The method of claim 1, wherein the authentication is performed in conjunction with a transaction.

12. The method of claim 11, wherein the transaction is a purchase of a product or service by the customer.

13. The method of claim 12, wherein the transaction is enrollment of the customer into a service offered by the authenticating entity.

14. The method of claim 11, wherein the transaction requires approval from at least one transaction approver, the method further comprising soliciting approval from the at least one transaction approver before authenticating the customer.

15. The method of claim 14, further comprising determining a geographical location of the at least one transaction approver; and
comparing the geographical location of the at least one transaction approver with a location of the transaction, so as to determine legitimacy of the transaction.

16. The method of claim 1, wherein the primary communication channel is a website of the authenticating entity and the secondary communication channel is a telephone call, text message or e-mail to the customer, the method further comprising:
the customer receiving the telephone call, text message or e-mail from the authenticating entity via the secondary communication channel; and
the customer transmitting, via the website, the at least a portion of the secondary authentication information back to the authenticating entity.

17. The method of claim 1, wherein the customer information comprises a land-line telephone number, a cell number, an email address, or SMS information of the customer, by which to contact the customer on a channel different than the primary communication channel.

18. A method for performing a multifactor authentication between an authenticating entity and a customer remote from the authenticating entity, utilizing a primary communication channel and a secondary communication channel, the method comprising:
receiving from the customer, by a processing machine of the authenticating entity, primary authentication information via the primary communication channel;
processing the primary authentication information by the processing machine of the authenticating entity, and retrieving customer information based on the primary authentication information;
transmitting, by the processing machine of the authenticating entity, secondary authentication information to the customer via the secondary communication channel, the secondary communication channel being different than the primary communication channel;
receiving from the customer via the primary communication channel at least a portion of the secondary authentication information;
processing the secondary authentication information received from the customer by the processing machine of the authenticating entity to authenticate the customer; and
based on successful authentication of the primary authentication information and receipt of the at least a portion of the secondary authentication information from the customer, the processing machine of the authenticating entity authenticating the customer; and
wherein the authentication times out upon expiration of a time-out period, which time-out period starts after receipt of the primary authentication information via the primary communication channel.

19. A system that performs authentication processing, the system including:
a communication interface portion configured to interface with a customer and receive primary authentication information from the customer via a primary communication channel;
an authenticating portion that is located remote from the customer, the authenticating portion configured to:
authenticate the primary authentication information received from the customer, and based on the primary authentication information, retrieve customer information, the customer information verifying at least in part the primary authentication information,
present a message to the customer regarding a desired mode of communication through which the customer would like to perform a secondary authentication;
receive from the customer a selection of the desired mode of communication, which desired mode of communication comprises a secondary communication channel;
output secondary authentication information to the customer via the secondary communication channel that is different than the primary communication channel, the secondary authentication information comprising at least one selected from the group consisting of a password and an authentication code;
process the secondary authentication information, received from the customer via the primary communication channel, to authenticate the customer, and
based on successful receipt of the primary authentication information and the secondary authentication information from the customer, output an approval for the transaction.

20. The system of claim 19, wherein the primary communication channel is the Internet and the secondary authentication information is transmitted via at least one of a telephone call, text message, or e-mail to the customer.

21. The system of claim 19, wherein the customer information comprises a land-line telephone number, a cell number, an email address, or SMS information of the customer, by which to contact the customer on a channel different than the primary communication channel.

22. The system of claim 19, wherein the communication interface portion is further configured to determine whether the system recognizes a computer that the customer is using to send the primary authentication information via the primary communication channel.

23. The system of claim 19, wherein the customer communicates with the system using a smartphone.

24. The system of claim 23, wherein the customer also communicates with the system using a computer separate from the smartphone.

* * * * *